United States Patent [19]
Brasz et al.

[11] 4,452,977
[45] Jun. 5, 1984

[54] PROCESS FOR THE PREPARATION OF POLYMER MELTS WHICH ARE SUBSTANTIALLY FREE OF VOLATILE COMPONENTS

[75] Inventors: Albert J. H. Brasz, Born; Nicolaas P. Nagtzaam, Sittard; Cornelis Bronke, Geleen, all of Netherlands

[73] Assignee: Stamicarbon B.V., Geleen, Netherlands

[21] Appl. No.: 386,314

[22] Filed: Jun. 8, 1982

[30] Foreign Application Priority Data

Jun. 17, 1981 [NL] Netherlands ......................... 8102930

[51] Int. Cl.$^3$ ............................. C08F 6/00; C08F 6/10
[52] U.S. Cl. .................................... 528/500; 526/348; 526/352; 526/352.2; 528/481; 528/499; 528/501
[58] Field of Search ................ 528/481, 499, 500, 501

[56] References Cited

U.S. PATENT DOCUMENTS 3,476,736  11/1969  Kahre ................................... 528/481
4,186,047  1/1980  Salmon ................................ 528/501

Primary Examiner—Harry Wong, Jr.
Assistant Examiner—S. Babajko
Attorney, Agent, or Firm—Cushman, Darby & Cushman

[57] ABSTRACT

A process for the preparation of alkene polymer melts being substantially free of volatile components comprises introducing an alkene polymer melt having a melt index of less than 4 dg/min and a content of volatile components of less than 10 percent by weight into a cooled degasification extruder and subjecting the melt in the extruder kneading zone to intense cooling under pressure and in the extruder degasification zone to cooling which is less intense than in the kneading zone and under reduced pressure.

17 Claims, 2 Drawing Figures

PROCESS FOR THE PREPARATION OF POLYMER MELTS WHICH ARE SUBSTANTIALLY FREE OF VOLATILE COMPONENTS

BACKGROUND AND SUMMARY OF THE INVENTION

The present invention relates to a process for the preparation of polymer melts which are substantially free of volatile components utilizing a starting material of highly viscous alkene polymer melts containing solvent(s) and/or monomer residues.

It is known to use screw extruders provided with degasification orifices at reduced pressure for the degasification of solvent-containing polymer melts. However, in conventional multi-screw extruders in particular, the processing of certain alkene polymer melts causes such increased heating of the polymer melt that cooling through the extruder wall is necessary.

However, it has been discovered that using such conventional degasification extruders for the processing of highly viscous polymer melts can have unfavorable consequences. Indeed, it has been found that when alkene polymers are processed having a melt index (as will be defined hereinafter) of less than 4 dg/min, under the usual cooling conditions, the polymer melt in the degasification zone(s) of the extruder balls into a mass which no longer spreads over the extruder screw. This phenomenon has an extremely adverse effect on the degasification of the polymer melt.

It has now been found that such disadvantageous phenomena occurring when highly viscous polyalkene melts are processed in a temperature-controlled degasification extruder can be avoided and that polymer melts can be obtained which are substantially free of volatile components by working under well-defined conditions according to the present invention.

These new processing conditions according to the present invention are characterized in that an alkene polymer melt having a melt index lower than 4 and at a content of volatile components of less than 10 percent, is treated in one or more sections incorporated in a cooled degasification extruder having at least one kneading zone where the melt is subjected to pressure buildup and substantially, at least one degasification zone where the melt is subjected to reduced pressure. The cooling in the kneading zone(s) according to the present invention is intense, whereas in the degasification zone(s) cooling or heating is less intense.

Generally, such a temperature control, or rather heat exchange, cannot be effected straightforwardly. An extruder is usually surrounded by a jacket enabling heating or cooling of the contents of the extruder with a heating or cooling liquid or with other media for the supply or withdrawal of heat. Such a jacket wall is usually divided into 3 or 4 zones so as to enable independent temperature settings at the feed section, in two or more zones along the screw or screws and at the head. For the realization of the process according to the invention it is necessary that the temperatures in the kneading zones and in the degasification zones of the extruder to be used can be set independetly of each other, or rather that the heat exchange, in particular the withdrawal of heat, can be controlled independently in these zones. This requires that the extruder be provided with suitable contrivances. This means that the jacket wall must be divided into section coinciding with the kneading zones and the degasification zones, in which sections different cooling rates can be effected, for example by a difference in temperature between the cooling liquids. Any other known method can of course also be used.

By the term "melt index" of an alkene polymer as used herein, it is intended to refer to the amount of polymer flowing through a standard orifice under standard conditions of temperature and pressure, expressed in decigram/minute (dg/min). For polyethylene, in particular, the standard conditions according to ISO standard R 292 resp. ASTM standard D 1238 condition E are used. For other alkene polymers, the standards used are such that product with processing and flow characteristics which, under adapted temperatures and pressure conditions, are comparable to those of particular polyethylene products, and which exhibit a melt index comparable to the melt index of such particular polyethylene products according to the ISO standard R 292 and ASTM standard D 1238. For example, at a load of 2.16 kg and a temperature of 503° K. such other alkene polymers yield melt index values for polypropylene which, in practice, are comparable to the melt index values according to ISO standard R 292 resp. ASTM D 1238 for polyethylene.

Further research has shown that the "balling" effect of the polymer melt occurs when the differential in temperature between the polymer melt and the cooled extruder wall exceeds a particular critical value. On the one hand, this critical difference in temperature appears to depend on the viscoelastic properties (which may be influenced by e.g., molecule structure) of the polyalkene processed, the viscoelastic properties as such depending on the process temperature. Thus, it has been observed that the higher the molecular weight of the material, and/or the more branched its chains, the smaller the critical difference in temperature between the polymer melt and the extruder wall which marks incipient balling. In addition, the critical difference in temperature is smaller the lower the temperature is for the melt is lower.

Preferably, the process according to the present invention is embodied so that in a cooled degasification extruder, the temperature of the extruder wall in the degasification zone(s) is kept higher than the temperature at which the polymer melt would ball into a mass thereby wholly or partially unsticking from the extruder screw at the relative polymer melt composition and temperature.

Thus, the temperature of the extruder jacket in the degasification zone(s) should satisfy the relation:

$$T_{ext} > T_m - \Delta T_{cr}$$

where $T_{ext}$ is the temperature of the interior wall of the jacket of the extruder, $T_m$ is the temperature of the polymer melt, and $\Delta T_{cr}$ refers to the characteristic difference in temperature between a cooled extruder wall and the polymer melt which marks the balling of the polymer melt at the relative composition and temperature of the polymer melt. The characteristic extruder wall temperature can easily be determined empirically by one skilled in the art for any composition of polymer desired to be processed.

The efficiency of the process according to the present invention is improved when a stripping agent for the volatile components is kneaded into the polymer melt in the kneading zone, such as, in particular, water and/or steam, methanol or an inert gas, for example, nitrogen.

As mentioned above, in the process according to the present invention the polyalkene polymer is processed in the degasification zone(s) at reduced pressure, the content of volatile components being lower than 10% by weight. However, the process is particularly suited for the processing of polymer solutions as obtained in processes by which alkenes are (co)polymerized in solution (the so-called solution processes), which solutions have a content of volatile components (solvent, such as, for example, cyclohexan, hexane or gasoline, and comonomer, such as for instance hexene, octene or decene) that generally is considerably higher.

According to one embodiment of the present invention, a polymer solution having a content of volatile components of between about 5 to about 25 wt. percent can be initially passed through a flash evaporator zone in the extruder with backward flash degasification where the content of volatile components is reduced to less than about 2-10 wt. percent before the low-pressure degasification zone(s).

Preferably, a devolatilization extruder is used which has one backward flash degasification orifice and two forward low-pressure degasification zones, the pressure at the backward degasification orifice being approximately atmospheric, whereas in the first degasification zone a pressure ranging between about 50 and about 250 mbar is maintained and in the second degasification zone, a pressure ranging from between about 10 and about 100 mbar is maintained. Suitably, use can be made of a twin-screw extruder with co-rotating screws, and in particular, a twin-screw extruder with parallel, fully intermeshing co-rotating screws.

According to another preferred embodiment of the present invention, the efficiency of the process can be improved by using a gear-type pump for the eventual pressure buildup in the polymer melt from the last degasification zone to the die plate. Indeed, using such a gear-type pump enables degasification at a higher temperature, without too high of a temperature which can be disadvantageous to the polymer developing at the die plate.

The process according to the present invention is particularly suitable for the treatment of polyalkene melts consisting of an ethylene polymer or copolymer with a melt index lower than 4 according to ISO standard R 292, resp. ASTM D 1238 and, in particular, with a melt index lower than 3. Materials which are especially suitable for processing according to the present inventive process are, in particular, polyalkene melts of so-called linear low-density polyethylene.

DETAILED DESCRIPTION OF THE PREFERRED EXEMPLARY EMBODIMENTS

The invention will be described in more detail by referring to the following non-limiting examples.

Figure 1:
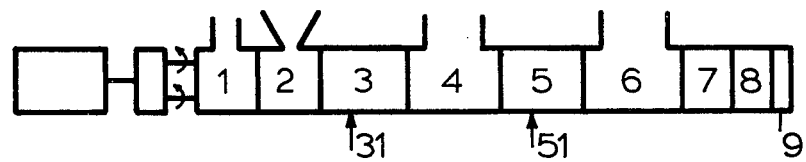
FIG. 1 is a schematic representation of a twin-screw extruder.

In the examples which follow, melts of various highly viscous polyalkene materials (melt index of less than 4 dg/min.) are processed in a twin-screw degasification extruder with parallel fully intermeshing co-rotating screws, as indicated schematically in FIG. 1. The extruder comprises a feeding section 2, a backward degasification section 1 at substantially atmospheric pressure, a first mixing section 3 with a feed line 31 for introducing stripping water/steam, a first degasification section 4 at reduced pressure, a second mixing section 5 with a feed line 51 for introducing stripping water/steam, a second degasification section 6 at reduced pressure, a final pressure buildup section 7-8, and a granulator 9.

EXAMPLE 1

A polyethylene sample with a density of 937 kg/m$^3$ and a melt index of 1 dg/min is fed to the extruder as a solution containing 87 wt. percent of polyethylene and 13 wt. percent hexane-octene mixture at 220° C., and processed under various temperature and cooling conditions. The content of volatile components is reduced by the backward degasification of the polymer solution so that the melt contains less than 6 wt. percent volatile components when entering the first mixing section 3.

a. Cooling of the entire extruder jacket to a temperature below the critical "balling" temperature Water is introduced as a stripping agent in the mixing sections 3 and 5. The extruder jacket is strongly cooled along the total length of the mixing sections, degasification sections, and final pressure-buildup section (e.g., 2800 liters of cooling oil at 100° C.). It can be observed through a sight glass that the polymer melt balls up and unsticks from the extruder screws. The temperature of the extruder jacket and of the polymer melt in the degasification zones 4 and 6, as well as the temperature of the melt on the pressure side of the die plate of the granulator 9, are given in Table 1, together with the content of the volatile components in the polymer melt after the last degasification zone.

b. Cooling of the entire extruder jacket to a temperature above the critical "balling" temperature Water is introduced as a stripping agent in the mixing sections 2 and 6. Along the total length of the mixing section, degasification sections, and the final pressure-buildup section, the extruder jacket is cooled to such a degree (e.g., 2800 liters of cooling oil at 210° C.) that no balling of the polymer melt in the degasification zones occurs. The temperatures of the extruder jacket and of the polymer melt in the degasification sections 4 and 6, as well as the temperature of the melt on the pressure side of the die plate of the granulator 11, are given in Table 1, together with the content of residual hexane and octene in the polymer melt after the last degasification zone. The toal content of residual volatile components amounts to 460 ppm, but the temperature of the melt at the die plate is considerably higher than in the above experiment.

c. Processing conditions according to the invention: selective cooling of the extruder jacket in the mixing sections Water is introduced as a stripping agent in the mixing sections 3 and 5. The extruder jacket is intensely cooled (e.g., 2100 liters of cooling oil at 110° C.) in the mixing sections 3 and 5, and in the final pressure-buildup section 7/8. The extruder jacket is also cooled to a limited extent (900 liters of cooling oil at 170° C.) in the degasification sections 4 and 6.

It can be observed through the sight glasses in the degasification sections that the polymer melt does not ball up and spreads well over the extruder screws. The temperature of the extruder jacket and of the polymer melt in the degasification zones, as well as the temperature of the melt at the die plate are shown in Table 1, together with the content of volatile components in the polymer melt after the last degasification zone.

TABLE 1

Degasification of a polyethylene melt with melt index 1 dg/min, under processing conditions according to the invention (c) and under reference conditions (a and b) are given in the following:

| processing conditions | temperature in °C. 1st degasification zone | | | 2nd degasification zone | | | die plate | residue contents (ppm) | |
|---|---|---|---|---|---|---|---|---|---|
| | $T_{ext}$ | $T_m$ | T | $T_{ext}$ | $T_m$ | T | | hexane | octene |
| (a) intense cooling entire extruder | 152 | 186 | 34 | 144 | 175 | 31 | 220 | 780 | 1890 |
| (b) moderate cooling entire extruder | 230 | 248 | 18 | 225 | 248 | 23 | 268 | 140 | 320 |
| (c) selective intense cooling in mixing sections | 193 | 204 | 11 | 180 | 192 | 12 | 227 | 300 | 680 |

EXAMPLE 2

A polyethylene sample with a density of 920 kg/m³ and a melt index of 2 dg/min is fed to an extruder as a solution containing 87 wt. percent of polyethylene and 13 wt. percent hexane-octene mixture, at a temperature of 220° C., and is further processed under various heating and cooling conditions. The content of volatile components is reduced by the backward degasification of the polymer solution and when the solution enters the first mixing section 3, the conent of volatile components amounts to less than 6 wt. percent. Water is introduced as a stripping agent in the mixing sections 3 and 5.

a. Cooling of the entire extruder jacket to a temperature below the critical "balling" temperature The extruder jacket is intensely cooled (e.g., 2800 liters of cooling oil at 78° C.) along the total length of the mixing sections, degasification sections, and the final pressure-buildup section. The polymer melt balls up in the degasification zones and does not spread over the extruder screws any longer. The temperatures of the extruder jacket, the polymer melt in the degasification zones, and the temperature of the melt on the pressure side of the die plate, are given in Table 2, together with the content of volatile components in the polymer melt after the last degasification.

b. Cooling of the entire extruder jacket to a temperature above the critical "balling" temperature The extruder jacket is cooled to such an extent (e.g., 2800 liters of cooling oil at 185° C.) along the total length of the mixing sections, degasification sections, and final pressure-buildup section that no balling of the polymer melt in the degasification zones occurs. The temperature of the extruder jacket, the polymer melt in the degasification zones, and the temperature of the melt on the pressure side of the die plate are given in Table 2, together with the content of residual hexane and octene in the polymer melt after the last degasification zone. The total content of residual volatile components amounts to 965 ppm, but the temperature of the melt at the die plate is considerably higher than in the above experiment.

c. Processing conditions according to the invention: selective cooling of the extruder jacket in the mixing sections Intense selective cooling is applied to the extruder jacket in the mixing sections 3 and 5 and in the final pressure-buildup section 7/8 (e.g., 1900 liters of cooling oil at 85° C.). Limited cooling is applied in the degasification sections (e.g., 900 liters of cooling oil at 165° C.). The polymer melt does not ball up and spreads well over the extruder screws. The temperatures of the extruder jacket, the polymer melt as measured in the degasification zones, as well as the temperatures of the melt at the die plate, are given in Table 2, together with the content of residual hexane and octene in the polymer melt after the last degasification zone.

TABLE 2

Degasification of a polyethylene melt with melt index 1 dg/min, under processing conditions according to the invention (c) and under reference conditions (a and b) are given in the following:

| processing conditions | temperature in °C. 1st degasification zone | | | 2nd degasification zone | | | die plate | residue contents (ppm) | |
|---|---|---|---|---|---|---|---|---|---|
| | $T_{ext}$ | $T_m$ | T | $T_{ext}$ | $T_m$ | T | | hexane | octene |
| (a) intense cooling entire extruder | 127 | 172 | 45 | 123 | 165 | 42 | 200 | 970 | 2380 |
| (b) moderate cooling of entire extruder | 205 | 222 | 17 | 201 | 220 | 19 | 230 | 215 | 750 |
| (c) intense selective cooling in mixing sections | 185 | 193 | 8 | 173 | 185 | 7 | 205 | 320 | 725 |

EXAMPLE 3

Pressure buildup before the die plate with the aid of a gear-pump

Figure 2:
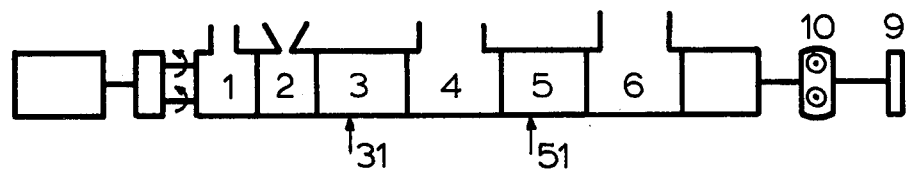
FIG. 2 is a schematic representation of a twin-screw extruder utilizing a gear pump.

A polyethylene sample with a density of 937 kg/m³ and a melt index of 1 dg/min is processed as a solution containing 87 wt. percent of polyethylene and 13 wt. percent hexane-octene mixture in a degasification extruder similar to the one described above, except that the final pressure buildup is not effected in a twin-screw section. Instead, the extruder at the outlet of the last degasification zone 6 is connected with a gear-pump 10 which provides the pressure required for the die plate of the granulator 9 as indicated in FIG. 2.

The polymer solution is initially introduced at a temperature of 220° C. and the content of volatile components is reduced to less than 6 wt. percent by backward degasification. Water is introduced as a stripping agent in the mixing sections 3 and 5. The extruder jacket is cooled selectively in the mixing sections 3 and 5, and is not cooled in the degasification sections 4 and 6, so that the temperature of the melt leaving the last degasification zone is 239° C. The temperature of the melt at the die plate of the granulator is not higher than 240° C. by using the gear-pump. A total content of residual volatile components of 560 ppm is measured at the granulator.

When the final pressure buildup is effected with the aid of a twin-screw section 7/8 according to FIG. 1, the temperature of the melt achieved by cooling when it leaves the last degasification zone must be 221° C. if the same temperature of 240° C. is to be achieved at the die plate of the granulator. Under these conditions a total content of volatile components of 850 ppm is measured at the granulator.

It has been previously found as noted in the above examples that when extruding ethylenepolymers having densities of at least 0,915 and up to 0,965 the temperature of the extruder jacket ($T_{ext}$) in the first degasification zone is preferably in the range between about 100° C. and about 250° C. while in the second degasification zone the temperature of the extruder jacket is preferably in the range between about 100° C. and 250° C. Pressures in the first degassification zone and the second degasification zone are preferably in the range between about 50 mbar and 500 mbar, and between about 5 mbar and 100 mbar, respectively.

It will therefore be appreciated when consideration is given to the above examples that by utilizing the selective conditions according to the present invention significant improvements are achieved when processing highly viscous alkene polymer melts having a melt index of less than 4 dg/min. Moreover, when processing such alkene polymer melts according to the present invention, a considerable advantage is realized in that the "balling" effect normally encountered in cooled degasification extruders is eliminated.

Thus, while the present invention has been herein described in what is presently conceived to be the most preferred embodiments thereof, those in the art may realize that modifications may be made within the scope of the present invention, which scope shall be accorded the broadest interpretation of the appended claims so as to encompass all equivalent processes and/or methods.

What is claimed is:

1. A process for the preparation of alkene polymer melts being substantially free of volatile components comprising the steps of:
   (a) introducing an alkene polymer melt into a cooled degasification extruder including at least a kneading zone and a subsequent degasification zone, said melt having a melt index of less than 4 dg/min and a volatile component of less than about 10 percent by weight;
   (b) cooling said melt in said kneading zone by cooling said kneading zone with a coolant of at most 110° C.; and
   (c) cooling said melt subsequent to step (b) in said degasification zone with a coolant having a temperature greater than the temperature of the coolant in said kneading zone.

2. A process as in claim 1 wherein the temperature of the extruder jacket in the degasification zone is higher than the temperature at which, at the relative polymer melt composition and temperature, the polymer balls into a mass which completely or partially unsticks from the extruder screw.

3. A process as in claim 1 or 2 wherein the temperature of the extruder jacket in the degasification zone satisfies the condition:

$$T_{ext} > T_m - \Delta T_{cr}$$

where $T_{ext}$ is the temperature of the interior wall of the extruder jacket and $T_m$ is the temperature of the polymer melt, and $\Delta T_{cr}$ represents the characteristic critical difference in temperature between a cooled extruder wall and a polymer melt at which, for the relative polymer melt composition and temperature, the polymer melt balls into a mass which substantially does not spread over the extruder screw.

4. A process as in claim 3 wherein step (b) is practiced by kneading a stripping agent for the volatile components into said melt in the kneading zone.

5. A process as in claim 4 wherein the stripping agent is water and/or steam.

6. A process as in claim 5 wherein prior to step (b) there is practiced the step of treating said melt in a flash degasification zone with backward flash degasification to reduce the content of the volatile components in said melt from an initial content of between about 5 to about 25 wt. percent to a content less than about 2 to about 10 wt. percent.

7. A process as in claim 6 wherein a degasification extruder with backward flash degasification orifice and two forward degasifiction zones at reduced pressure is utilized, the pressure at the backward degasification orifice being approximately atmospheric, while at the first degasification zone a pressure ranging from 50 to 250 mbar is maintained, and at the second degasification zone a pressure ranging between 10 and 100 mbar is maintained.

8. A process as in claim 7 wherein said extruder is a twin-screw extruder with co-rotating screws.

9. A process as in claim 8 wherein said extruder includes parallel fully intermeshing screws.

10. A process as in claim 9 wherein the eventual extruder pressure at the outlet of the extruder after the outlet of the last degasification zone is achieved by means of a gear-pump.

11. A process as in claim 10 wherein the twin-screw extruder includes means separating the kneading zone from the degasification zone at reduced pressure, said separating means including two double screw elements with opposite helix angles.

12. A process as in claim 10 wherein said polyalkene melt is an ethylene polymer or copolymer having a melt index less than 4 dg/min according to ISO standard R 292 resp. ASTM D 1238.

13. A process as in claim 12 wherein said ethylene polymer or copolymer has a melt index less than 3 dg/min.

14. A process as in claim 10 wherein said alkene melt is a polyalkene melt of linear low-density polyethylene.

15. A process as in claim 1 or 2 wherein said polyalkene melt is an ethylene polymer or copolymer having a melt index less than 4 dg/min according to ISO standard R 292 resp. ASTM D 1238.

16. A process as in claim 15 wherein an ethylene polymer or copolymer having a melt index of less than 3 dg/min is treated.

17. A process as in claim 1 or 2 wherein said polyalkene melt is a linear low-density polyethylene.

* * * * *